(12) United States Patent
Higuchi (10) Patent No.: US 9,039,039 B2
(45) Date of Patent: May 26, 2015

(54) AIRBAG APPARATUS

(75) Inventor: Hitoshi Higuchi, Haga-gun (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 13/885,888

(22) PCT Filed: Jan. 4, 2012

(86) PCT No.: PCT/JP2012/050025
§ 371 (c)(1),
(2), (4) Date: May 16, 2013

(87) PCT Pub. No.: WO2012/098925
PCT Pub. Date: Jul. 26, 2012

(65) Prior Publication Data
US 2013/0234423 A1    Sep. 12, 2013

(30) Foreign Application Priority Data

Jan. 20, 2011  (JP) .................. 2011-009689

(51) Int. Cl.
*B60R 21/239* (2006.01)
*B60R 21/203* (2006.01)
*B60R 21/235* (2006.01)

(52) U.S. Cl.
CPC ............ *B60R 21/239* (2013.01); *B60R 21/203* (2013.01); *B60R 2021/23576* (2013.01)

(58) Field of Classification Search
CPC .... B60R 21/30; B60R 21/203; B60R 21/239; B60R 21/276; B60R 2021/239; B60R 2021/276; B60R 2021/2765; B60R 2021/2395; B60R 2021/23576

USPC ......................................................... 280/739
See application file for complete search history.

(56) References Cited

U.S. PATENT DOCUMENTS 7,118,127 B2 * 10/2006 Damm .......................... 280/739
7,490,849 B2 *  2/2009 Taniyama et al. ........... 280/728.2
7,883,110 B2 *  2/2011 Pausch .......................... 280/739
8,342,570 B2 *  1/2013 Higuchi ........................ 280/739

(Continued)

FOREIGN PATENT DOCUMENTS

DE           19517315    * 11/1996  ............ B60R 21/239
DE      102004058438 B3    5/2006

(Continued)

OTHER PUBLICATIONS

European Search Report, Application No. 12736055.0, dated Mar. 11, 2014, 5 pages.

(Continued)

*Primary Examiner* — Paul N Dickson
*Assistant Examiner* — Timothy Wilhelm
(74) *Attorney, Agent, or Firm* — Rankin, Hill & Clark LLP (57) ABSTRACT

An airbag apparatus for vehicle includes: an airbag body formed by joining outer peripheral portions of two base cloths, the two base cloths being superimposed on each other; an inflator introducing gas to an inside of the airbag body; and a vent hole formed on the airbag body and configured of a slit, the vent hole communicating between the inside and an outside of the airbag body, the slit being formed so as to be directed from the outer peripheral portions toward central portions of the two base cloths over the two base cloths.

4 Claims, 11 Drawing Sheets

(56) References Cited

U.S. PATENT DOCUMENTS

| | | | |
|---|---|---|---|
| 8,414,023 B2* | 4/2013 | Naganawa et al. | 280/743.2 |
| 2003/0222446 A1* | 12/2003 | Soderquist et al. | 280/743.1 |
| 2009/0224520 A1* | 9/2009 | Higuchi | 280/740 |

FOREIGN PATENT DOCUMENTS

| | | |
|---|---|---|
| EP | 1245461 A2 | 10/2002 |
| JP | 2001-354108 | 12/2001 |
| JP | 2002-059803 | 2/2002 |
| JP | 2003-312421 | 11/2003 |
| JP | 2007-302224 | 11/2007 |
| JP | 2008-179337 | 8/2008 |
| JP | 2009-040260 | 2/2009 |
| WO | 2010/121717 A1 | 10/2010 |

OTHER PUBLICATIONS

Chinese Office Action dated Feb. 3, 2015, Application No. 201280003681.6, partial English translation included, 8 pages.

* cited by examiner

AIRBAG APPARATUS

TECHNICAL FIELD

The present invention relates to an airbag apparatus.

BACKGROUND ART

When a vehicle collides, an airbag apparatus expands toward a vehicle compartment by gas supplied from an inflator, whereby constraining an occupant.

Priority is claimed on Japanese Patent Application No. 2011-009689, filed Jan. 20, 2011, the content of which is incorporated herein by reference.

In addition, when an airbag (corresponding to "airbag body" of the present application) expands and when an occupant is constrained by the airbag after the airbag expands, it is necessary to appropriately set the internal pressure of the airbag.

Specifically, when the airbag expands, it is necessary to instantly set the internal pressure of the airbag in a high-pressure state in order to quickly inflate the airbag.

Furthermore, when an occupant is constrained by the airbag, it is necessary to suppress the excessive increase of the internal pressure of the airbag in order to absorb the collision energy.

Therefore, a vent hole to release gas when an occupant is constrained is normally provided in an airbag apparatus.

When the airbag expands, the vent hole is closed, and therefore, the internal pressure of the airbag is instantly in a high-pressure state.

In addition, when an occupant is constrained by the airbag, the vent hole is opened, and therefore, the excessive increase of the internal pressure of the airbag when the occupant is constrained is suppressed (see Patent Document 1, for example).

The airbag apparatus disclosed in Patent Document 1 includes an inflator opening, a vent hole provided on a side portion of the inflator opening, and a vent hole cover to close the vent hole.

The vent hole cover is joined to the airbag at a sewing portion, and therefore, the vent hole is closed.

Furthermore, when the airbag expands, the vent hole cover prevents gas supplied from an inflator from leaking through the vent hole.

If the airbag inflates corresponding to the increase of the internal pressure of the airbag during the expansion of the airbag, the sewing portion is ruptured. Subsequently, the vent hole cover comes off and the vent hole is opened.

In addition, after the airbag expands, the gas in the airbag is released through the vent hole, whereby the excessive increase of the internal pressure of the airbag is suppressed when an occupant is constrained by the airbag.

PRIOR ART DOCUMENTS

Patent Documents

[Patent Document 1] Japanese Unexamined Patent Application, First Publication No. 2007-302224

DISCLOSURE OF INVENTION

Problems to be Solved by Invention

However, in the airbag apparatus of Patent Document 1, the separation of the vent hole cover depends on the separation of the sewing portion during the expansion of the airbag. Therefore, there is a problem in that the sewing portion has a complicated structure.

Specifically, the vent hole cover disclosed in Patent Document 1 is sewn on a base cloth of the airbag at a plurality of sewing portions having a spiral shape.

In addition, thick threads are used for the sewing portion provided on an outermost periphery of the base cloth so as not to be ruptured when the airbag expands. In contrast, slender threads are used for the sewing portion provided on an inner side of the outermost periphery such that the sewing portion is ruptured when the airbag expands.

In this manner, the airbag apparatus disclosed in Patent Document 1 has the sewing portion having a complicated structure. Therefore, there is a limit in cost reduction.

Therefore, an object of the invention is to provide an airbag apparatus which has a structure capable of being manufactured simply and at a low cost, whereby an airbag body can be rapidly expanded by instantly setting the internal pressure in a high-pressure state when expanding, and also, the excessive increase of the internal pressure of the airbag body can be suppressed when an occupant is constrained by the airbag body.

Means for Solving the Problems

In order to solve the problem described above, an airbag apparatus for the vehicle of the aspect of the invention includes: an airbag body formed by joining outer peripheral portions of two base cloths, the two base cloths being superimposed on each other; an inflator introducing gas to an inside of the airbag body; and a vent hole formed on the airbag body and configured of a slit, the vent hole communicating between the inside and an outside of the airbag body, the slit being formed so as to be directed from the outer peripheral portions toward central portions of the two base cloths over the two base cloths.

According to the aspect of the invention, the vent hole is configured of the slit which is formed so as to be directed from the outer peripheral portions toward central portions of the two base cloths over the two base cloths.

In this case, when the gas is introduced to the airbag body, the airbag body inflates in a normal direction of the base cloths, and also, an outer diameter thereof is decreased. Subsequently, the slit is closed.

Thereby, the leakage of the gas when the airbag body expands is suppressed, and therefore, the internal pressure of the airbag body is instantly in a high-pressure state. Subsequently, it is possible for the airbag body to rapidly expand.

Furthermore, when an occupant is constrained by the airbag body after the airbag body expands, the airbag body is pressed by the occupant along the normal direction of the base cloth, and also, an outer diameter thereof is increased. Subsequently, the slit is opened and functions as a vent hole.

Thereby, when the occupant is constrained by the airbag body, the gas is released from the airbag body. Subsequently, it is possible to suppress the excessive increase of the internal pressure of the airbag body.

Furthermore, since the vent hole is not opened until the occupant has been constrained by the airbag body, it is possible to remarkably lengthen the effect-duration period of the airbag, compared to the case of the related art.

Still further, since the vent hole is a slit, it is possible to form the vent hole by simply cutting two base cloths.

Therefore, the airbag of the aspect of the invention has a simple structure, and it is possible to manufacture it at a low cost.

As described above, the vent hole is configured of the slit. Thereby, using a structure capable of being manufactured simply and at a low cost, it is possible for the airbag body to rapidly expand by instantly setting the internal pressure in a high-pressure state when expanding.

Furthermore, it is possible to suppress the excessive increase of the internal pressure of the airbag body when an occupant is constrained by the airbag body.

In the airbag apparatus for the vehicle of the aspect of the invention, the vent hole may include: end portions provided on the slit and respectively formed on the two base cloths; and a pair of side-end portions of the base cloths that face each other interposing the slit therebetween.

Furthermore, at least one of the end portions may include a side-end joining portion formed by disposing the side-end portions so as to be drawn into the inside of the airbag body and joining the side-end portions to each other.

In an end portion of the slit, the airbag apparatus of the aspect of the invention includes a pair of side-end portions of the base cloths which face each other interposing the slit therebetween and has a side-end joining portion which is formed by disposing the pair of side-end portions so as to be drawn into the inside of the airbag body and joining the side-end portions each other.

Thereby, corresponding to the inflation of the airbag body when the airbag body expands, the whole part of the side-end portion of the base cloth which is along an extending direction of the slit is drawn into the inside of the airbag body, and therefore, the slit is securely closed.

Therefore, by instantly setting the internal pressure of the airbag body in a high-pressure state when the airbag body expands, it is possible for the airbag body to further rapidly expand.

Effects of the Invention

According to the aspect of the invention, a vent hole is configured of a slit which is formed so as to be directed from outer peripheral portions toward central portions of the two base cloths over the two base cloths.

In this case, when gas is introduced to the airbag body, the airbag body inflates in the normal direction of the base cloths, and also, the outer diameter thereof is decreased. Subsequently, the vent hole is closed.

Thereby, the leakage of the gas when the airbag body expands is suppressed, and therefore, the internal pressure of the airbag body is instantly in a high-pressure state. Subsequently, it is possible for the airbag body to rapidly expand.

Furthermore, when an occupant is constrained by the airbag body after the airbag body expands, the airbag body is pressed by the occupant along the normal direction of the base cloth, and also, an outer diameter thereof is increased. Subsequently, the vent hole is opened.

Thereby, when the occupant is constrained by the airbag body, the gas is released from the airbag body. Subsequently, it is possible to suppress an excessive increase of the internal pressure of the airbag body.

Furthermore, since the vent hole is not opened until the occupant has been constrained by the airbag body, it is possible to remarkably lengthen the effect-duration period of the airbag, compared to the case of the related art.

Still further, since the vent hole is a slit, it is possible to form the vent hole by simply cutting two base cloths.

Therefore, the airbag of the aspect of the invention has a simple structure, and it is possible to manufacture it at a low cost.

As described above, the vent hole is configured of the slit. Thereby, using a structure capable of being manufactured simply and at a low cost, it is possible for the airbag body to rapidly expand by instantly setting the internal pressure in a high-pressure state when expanding, and also, it is possible to suppress an excessive increase of the internal pressure of the airbag body when an occupant is constrained by the airbag body.

EMBODIMENTS FOR CARRYING OUT THE INVENTION

Hereinafter, an airbag apparatus according to an embodiment of the invention will be described with reference to drawings.

(Vehicle Provided with Airbag Apparatus)

Figure 1:
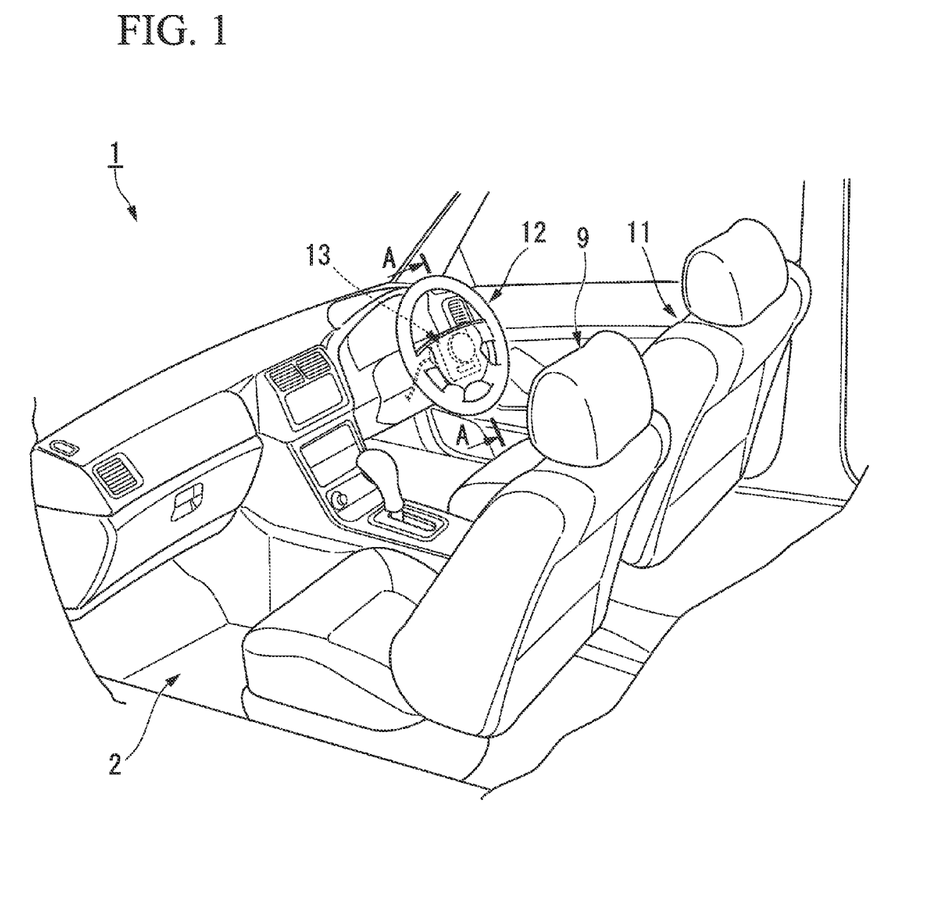
FIG. 1 is a perspective view showing a vehicle compartment provided with an airbag apparatus of an embodiment.

FIG. 1 is a perspective view showing a vehicle compartment 2 of a vehicle 1 provided with an airbag apparatus 13 (airbag apparatus for vehicle) of the embodiment.

Furthermore, in the following description, a front-rear direction of the vehicle 1 is designated as a front-rear direction, a left-right direction of the vehicle 1 is designated as a left-right direction, and an up-down direction of the vehicle 1 is designated as an up-down direction.

In addition, the vehicle 1 where a driver seat 11 is disposed on a right side of the vehicle 1 and a front passenger seat 9 is disposed on a left side of the vehicle 1 is described in the embodiment.

As shown in FIG. 1, the airbag apparatus 13 is accommodated in a steering wheel 12 disposed on a front side of the driver seat 11.

Figure 2:
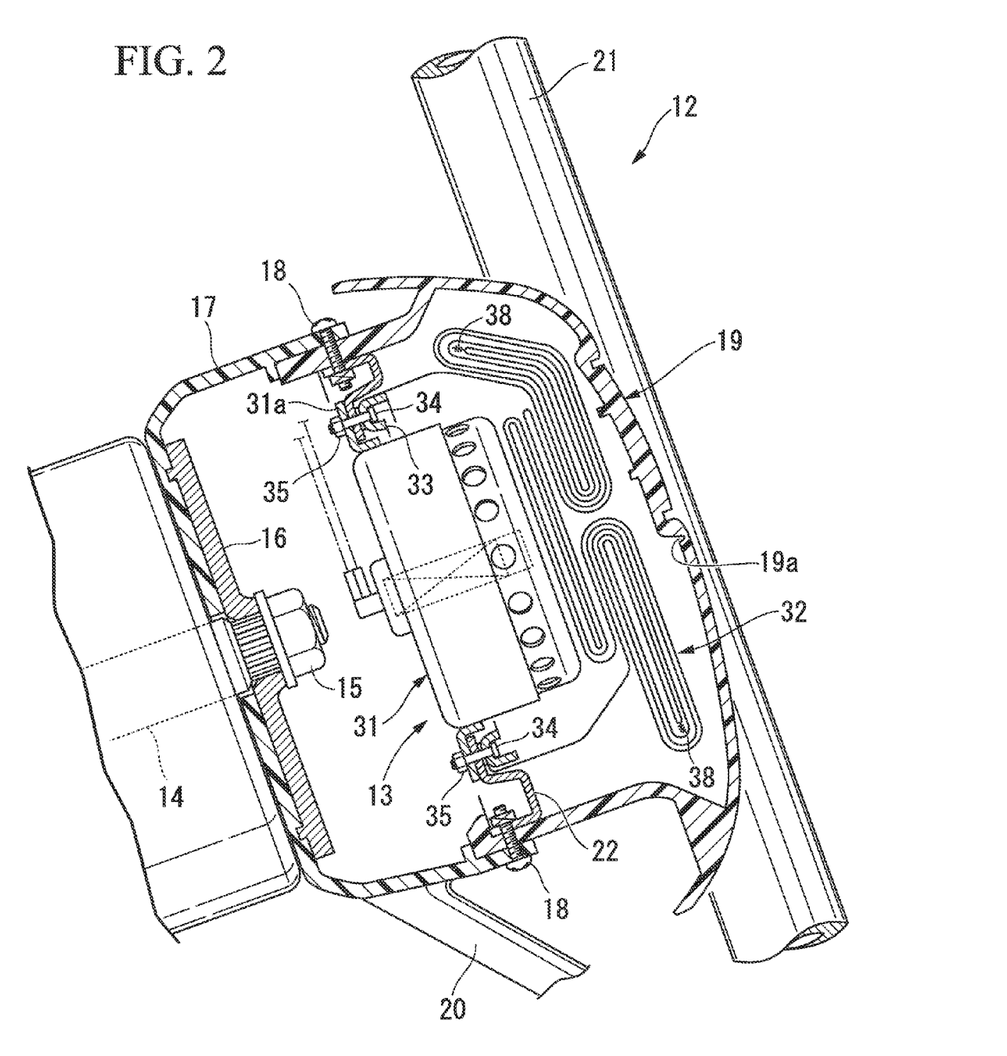
FIG. 2 is a cross-sectional view taken along a line A-A of FIG. 1.

FIG. 2 is a cross-sectional view taken along a line A-A of FIG. 1.

As shown in FIG. 2, in the steering wheel 12, a boss portion 16 is fixed to a rear end of a steering shaft 14 by a nut 15. Also, a front cover 17 having a cup shape is fixed to the boss portion 16.

A rear cover 19 is fixed to a peripheral edge of the front cover 17 by a plurality of bolts 18 so as to close the front cover 17.

A plurality of spoke portions 20 extending radially is installed on an outer peripheral surface of the front cover 17, and a steering wheel main body 21 is supported by the spoke portions 20.

In an inner peripheral surface of the rear cover 19, a retainer 22 is fastened to the front cover 17 and the rear cover 19 by the bolts 18, and the airbag apparatus 13 is supported by the retainer 22.

The front cover 17 and the rear cover 19 constitute an airbag cover to accommodate the airbag apparatus 13 therein.

A tier line 19a to promote rupture of the rear cover when the airbag expands is formed on an inner surface of the rear cover 19.

The tier line 19a has a substantially H shape seen from a front side of the rear cover 19.

When the airbag expands, the rear cover 19 is ruptured along the tier line 19a. Thereby, the rear cover 19 is deployed separately on upper and lower sides in FIG. 2.

(Airbag Apparatus)

Figure 3:
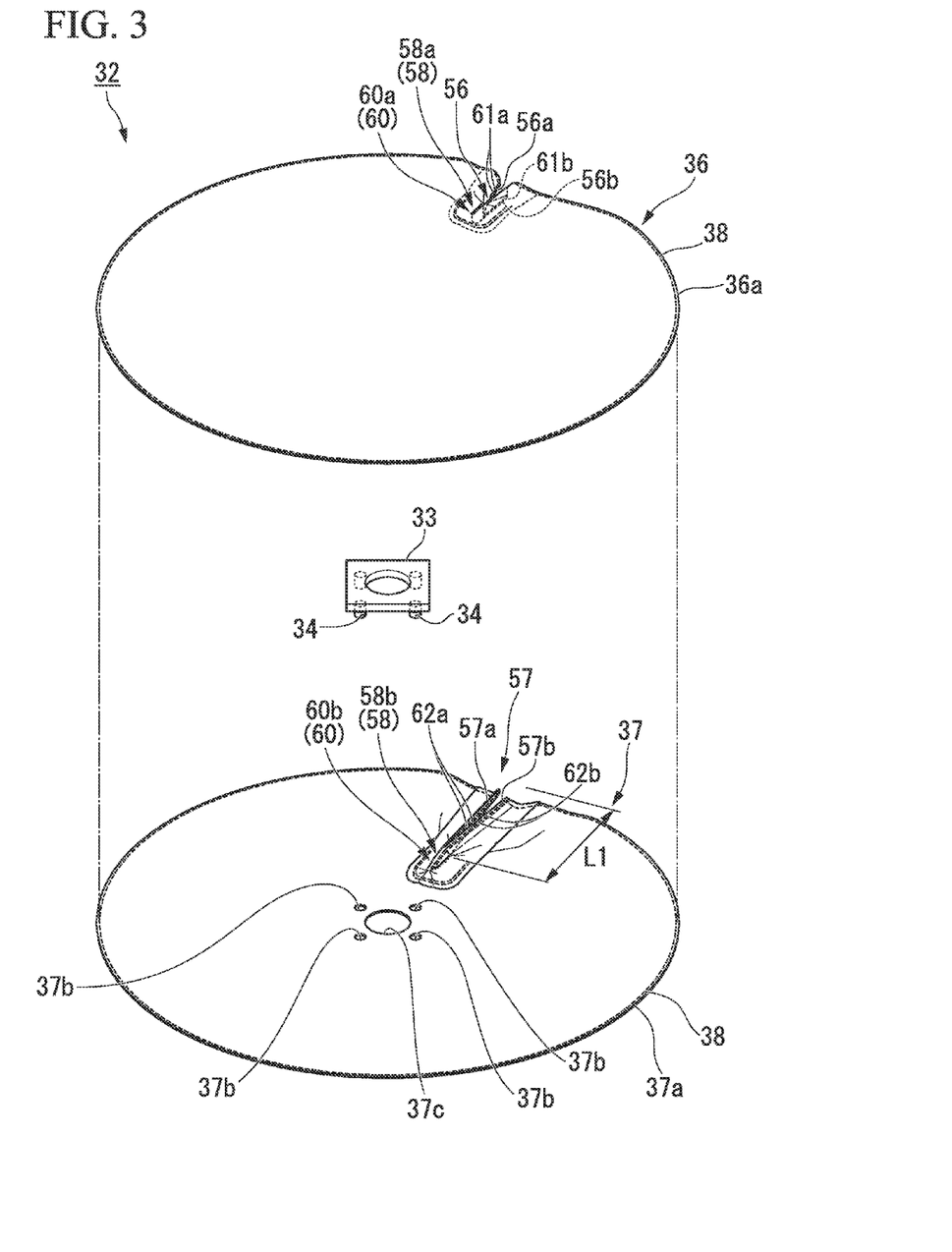
FIG. 3 is an exploded perspective view of the airbag of the embodiment.

The airbag apparatus 13 includes an airbag body 32 which is formed by joining outer peripheral portions 36a and 37a (see FIG. 3) of two base cloths 36 and 37 (that is, a first base cloth 36 and a second base cloth 37, see FIG. 3) superimposed on each other, an inflator 31 to introduce gas to an inside of the airbag body 32, and a fixing ring 33 to fix a base portion of the airbag body 32.

A flange 31a of the inflator 31 is disposed on a front side of the retainer 22.

In addition, the base portion of the airbag body 32 is disposed on a rear side of the retainer 22.

Furthermore, the fixing ring 33 is disposed on a rear side of the base portion of the airbag body 32.

Still further, the flange 31a of the inflator 31, the retainer 22, the base portion of the airbag body 32 and the fixing ring 33 are laminated in order from the front side toward the rear side. Also, they are fastened and fixed by a plurality of bolts 34 and nuts 35.

In other words, the base portion of the airbag body 32 is fixed in a state of being interposed between the retainer 22 and the fixing ring 33.

(Airbag)

FIG. 3 is an exploded perspective view of the airbag body 32 of the embodiment.

As shown in FIG. 3, the airbag body 32 having a circular shape includes the first base cloth 36 disposed on the rear side (side facing an occupant) and the second base cloth 37 disposed on the front side.

The first base cloth 36 is a fabric having a substantially circular shape in plan view.

From the outer peripheral portion 36a of the first base cloth 36 toward a central portion of the first base cloth 36, a first slit 56 is formed on the first base cloth 36.

The first slit 56 is formed by cutting the first base cloth 36.

The first slit 56 extends in a radial direction of the first base cloth 36, and formed at a position near the outer peripheral portion 36a of the first base cloth 36.

Furthermore, reinforcing sewing portions 61a and 61b are respectively provided on side-end portions 56a and 56b of the first base cloth 36, the side-end portions 56a and 56b facing each other interposing the first slit 56 therebetween.

Each of the reinforcing sewing portions 61a and 61b is formed at two positions near the side-end portions 56a and 56b of the first base cloth 36 so as to be parallel to the whole part of the first slit 56.

By providing the reinforcing sewing portions 61a and 61b and sewing the side-end portions 56a and 56b of the first base cloth 36, it is possible to improve the toughness of the side-end portions 56a and 56b more than in the case of only cutting the side-end portions 56a and 56b.

Furthermore, it is preferable to improve the toughness by sewing a reinforcing fabric around the side-end portions 56a and 56b.

The second base cloth 37 is a fabric which has a substantially circular shape in plan view and also has the substantially same diameter with the first base cloth 36.

A circular-shaped inflator opening 37c surrounding the inflator 31 (see FIG. 2) and a plurality of through holes 37b formed around the inflator opening 37c are formed on the second base cloth 37.

The inflator opening 37c is formed at the center of the second base cloth 37.

As described above, the second base cloth 37 is interposed between the rear surface of the retainer 22 (see FIG. 2) and the front surface of the fixing ring 33 and fastened by the plurality of bolts 34.

Thereby, the gas generated by the inflator 31 is supplied to the inside of the airbag body 32 through the inflator opening 37c at the center of the second base cloth 37.

In addition, on the second base cloth 37, a second slit 57 is formed so as to be directed from the outer peripheral portion 37a of the second base cloth 37 toward the central portion of the second base cloth 37.

The second slit 57 is formed at a position corresponding to the first slit 56 when the first base cloth 36 is superimposed on the second base cloth 37.

In this case, it is preferable that the length of the second slit 57 is set to be longer than in the first slit 56.

By setting the length of the second slit 57 to be longer than in the first slit 56, it is possible to suppress the amount of gas discharged through the first slit 56 on the occupant side when the gas is discharged from a vent hole 55. Also, it is possible to actively discharge the gas through the second slit 57 on the opposite side to the occupant side.

Therefore, it is possible to prevent an occupant discomfort.

Furthermore, a forming method of the second slit 57 and reinforcing sewing portions 62a and 62b formed on the side-end portions 57a and 57b of the second base cloth 37 have the same configuration with the first slit 56. Therefore, the description thereof will be omitted.

Also, by changing a length L1 (see FIG. 3) of the first slit 56 and the second slit 57, it is possible to change a period of time until the expansion of the airbag body 32 has been completed and the release amount of the gas in the airbag body 32 when an occupant is constrained by the airbag body 32. The detailed description thereof is as follows.

In the first base cloth 36, a first side-end joining portion 60a is formed on an end portion (first slit end portion) 58a on an inner diameter side along an extending direction of the first slit 56, as shown in FIG. 3.

Also, in the second base cloth 37, a second side-end joining portion 60b is formed on an end portion (second slit end portion) 58b on an inner diameter side along an extending direction of the second slit 57 as well.

In addition, the first side-end joining portion 60a formed on the first base cloth 36 has the same configuration with the second side-end joining portion 60b formed on the second base cloth 37.

Therefore, only the second side-end joining portion 60 will be described below, and the description of the first side-end joining portion 60a will be omitted.

Figure 4:
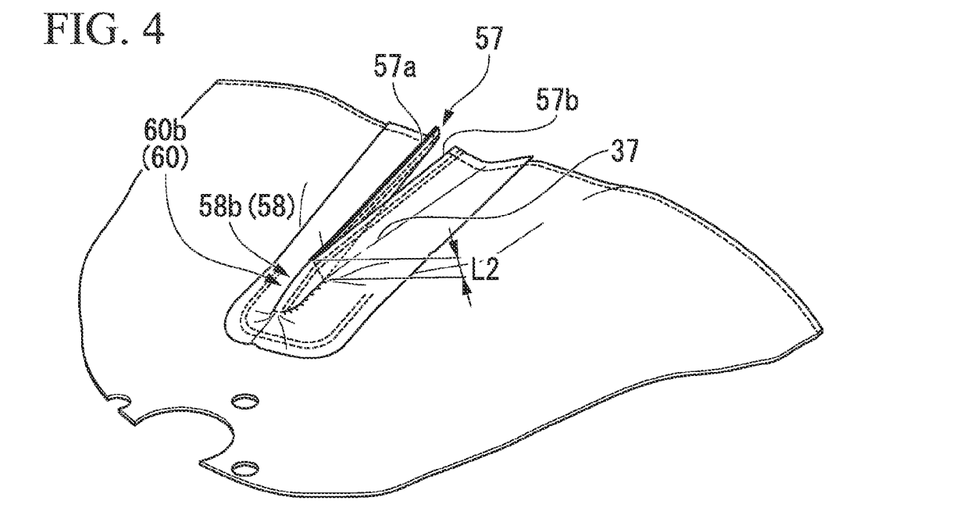
FIG. 4 is an enlarged view of a second side-end joining portion in FIG. 3.

FIG. 4 is an enlarged view of the second side-end joining portion in FIG. 3.

As shown in FIG. 4, the second side-end joining portion 60b is formed by disposing the side-end portion 57a on one side of the second base cloth 37 and the side-end portion 57b on the other side thereof, the side-end portion 57a and the side-end portion 57b facing each other interposing the second slit 57 therebetween, so as to be drawn into the inside (upper side in FIG. 4) of the airbag body 32, and by joining the side-end portion 57a on the one side to the side-end portion 57b on the other side in a sewn manner.

In the second side-end joining portion 60b, a drawing-in length L2 of the side-end portions 57a and 57b toward the inside of the airbag body 32 is a design item to be appropriately set.

Also, by changing the drawing-in length L2 of the side-end portions 57a and 57b, it is possible to change a period of time until the expansion of the airbag body 32 has been completed and the release amount of the gas in the airbag body 32 when an occupant is constrained by the airbag body 32. The detailed description thereof is as follows.

Figure 5:
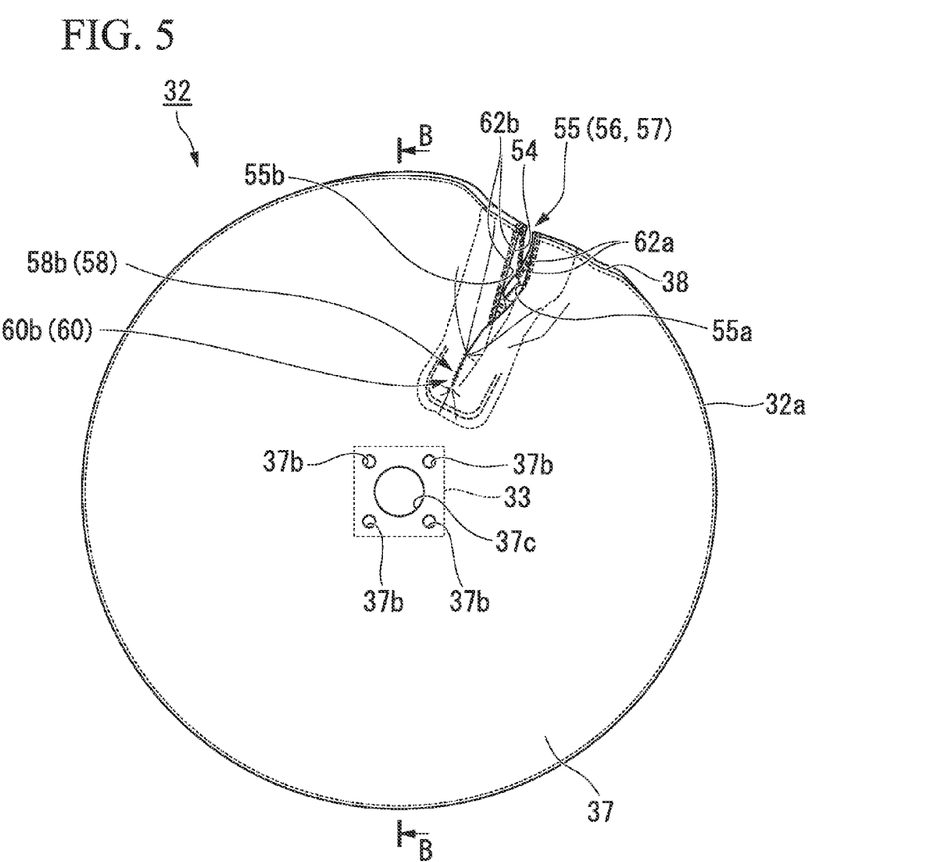
FIG. 5 is a plan view of the airbag seen from a front side.

FIG. 5 is a plan view of the airbag body 32 before expanding, when seen from a front side.

Figure 6:
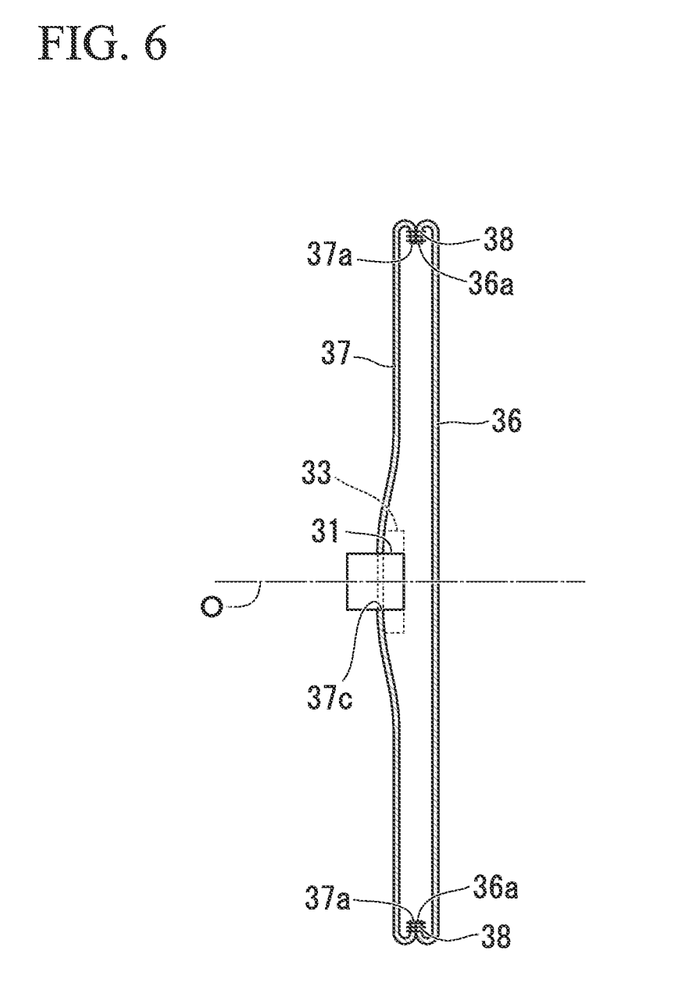
FIG. 6 is a cross-sectional view taken along a line B-B of FIG. 5.

FIG. 6 is a cross-sectional view taken along a line B-B of FIG. 5.

As shown in FIG. 6, the airbag body 32 is formed by superimposing the first base cloth 36 on the second base cloth 37 and joining it to each other.

The outer peripheral portion 36a of the first base cloth 36 is sewn on the outer peripheral portion 37a of the second base cloth 37 at a sewing portion 38 in a state of being drawn into the inner side of the airbag body 32.

Also, in the following description, a normal line of the first base cloth 36 and second base cloth 37 of the airbag body 32 before expanding is designated as a normal line O.

As shown in FIG. 5, the airbag body 32 includes a slit 54 formed by the first slit 56 formed on the first base cloth 36 and the second slit 57 formed on the second base cloth 37.

Over the first base cloth 36 and the second base cloth 37, the slit 54 is formed so as to be directed from the outer peripheral portion 32a of the airbag body 32 toward the central portions of the first base cloth 36 and the second base cloth 37.

In addition, when an occupant is constrained by the airbag body 32, the slit 54 functions as the bent hole 55 to release the gas in the airbag body 32.

Furthermore, since the vent hole 55 is formed on an outer peripheral side of the airbag body 32, it is possible to prevent the gas discharged through the vent hole 55 from directly hitting an occupant when the occupant is constrained by the airbag body 32. Therefore, it is possible to prevent occupant discomfort.

(Operation of Slit 54 and Vent Hole 55)

Next, the operation of the slit 54 and the vent hole 55 is described below.

Figure 7:
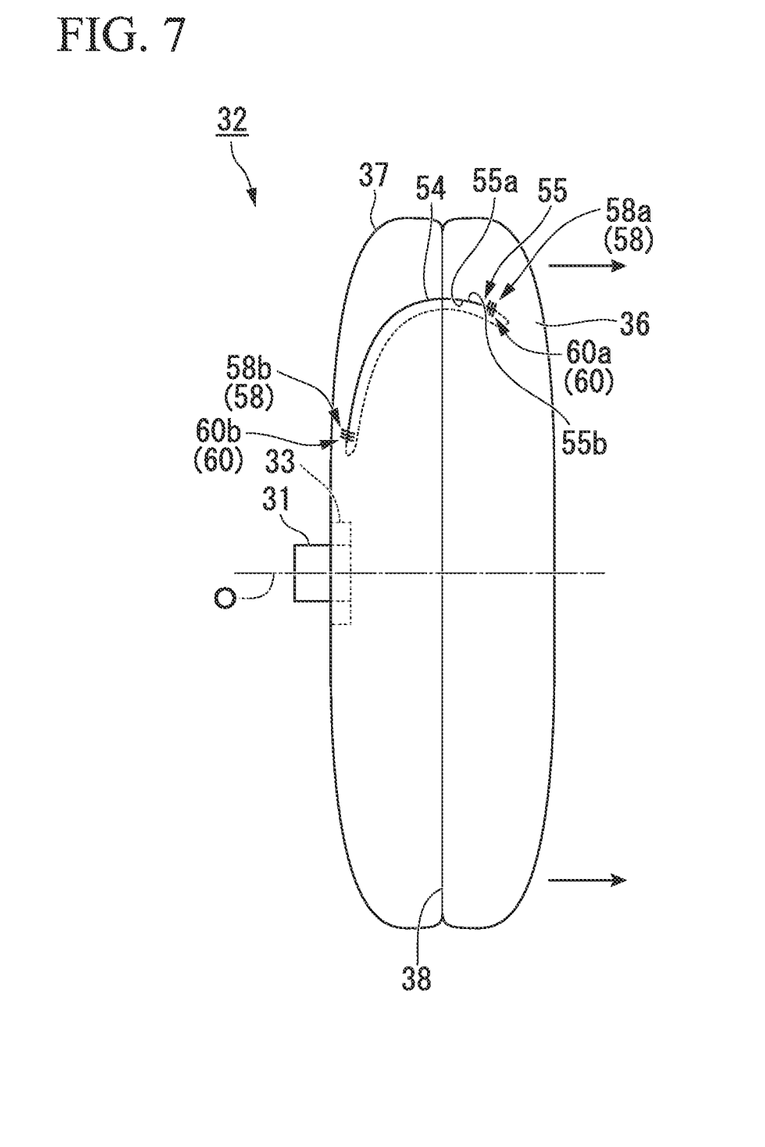
FIG. 7 is a side view of the airbag when expanding.

FIG. 7 is a side view of the airbag body 32 when expanding.

If the predetermined acceleration or more is detected when a vehicle 1 collides, the inflator 31 (see FIG. 2) is ignited. Thereby, the gas is supplied from the inflator 31 to the inside of the airbag body 32 in a folded state.

When the expansion of the airbag body 32 is started, the rear cover 19 is ruptured along the tier line 19a (both see FIG. 2) by receiving the pressure from the airbag body 32.

Subsequently, the airbag body 32 expands toward an occupant side (right side in FIG. 7).

When the airbag body 32 expands, the airbag body 32 inflates, and also, the outer diameter of the airbag body 32 is decreased.

Then, slit side-end portions 55a and 55b which face each other interposing the slit 54 are drawn into the inside of the airbag body 32 corresponding to the decrease of the outer diameter of the airbag body 32.

In this case, in the first slit end portion 58a of the first base cloth 36, the first side-end joining portion 60a is formed by disposing the side-end portions 56a and the side-end portion 56b of the first base cloth 36 so as to be drawn into the inside of the airbag body 32 and joining the side-end portions 56a and the side-end portion 56b to each other, as described above.

In addition, in the second slit end portion 58b of the second base cloth 37, the second side-end joining portion 60b is formed by disposing the side-end portions 57a and the side-end portion 57b of the second base cloth 37 so as to be drawn into the inside of the airbag body 32 and joining the side-end portions 57a and the side-end portion 57b to each other.

Therefore, the slit side-end portions 55a and 55b are easily drawn into the inside of the airbag body 32 so as to be along an extending direction of the vent hole 55.

Figure 8:
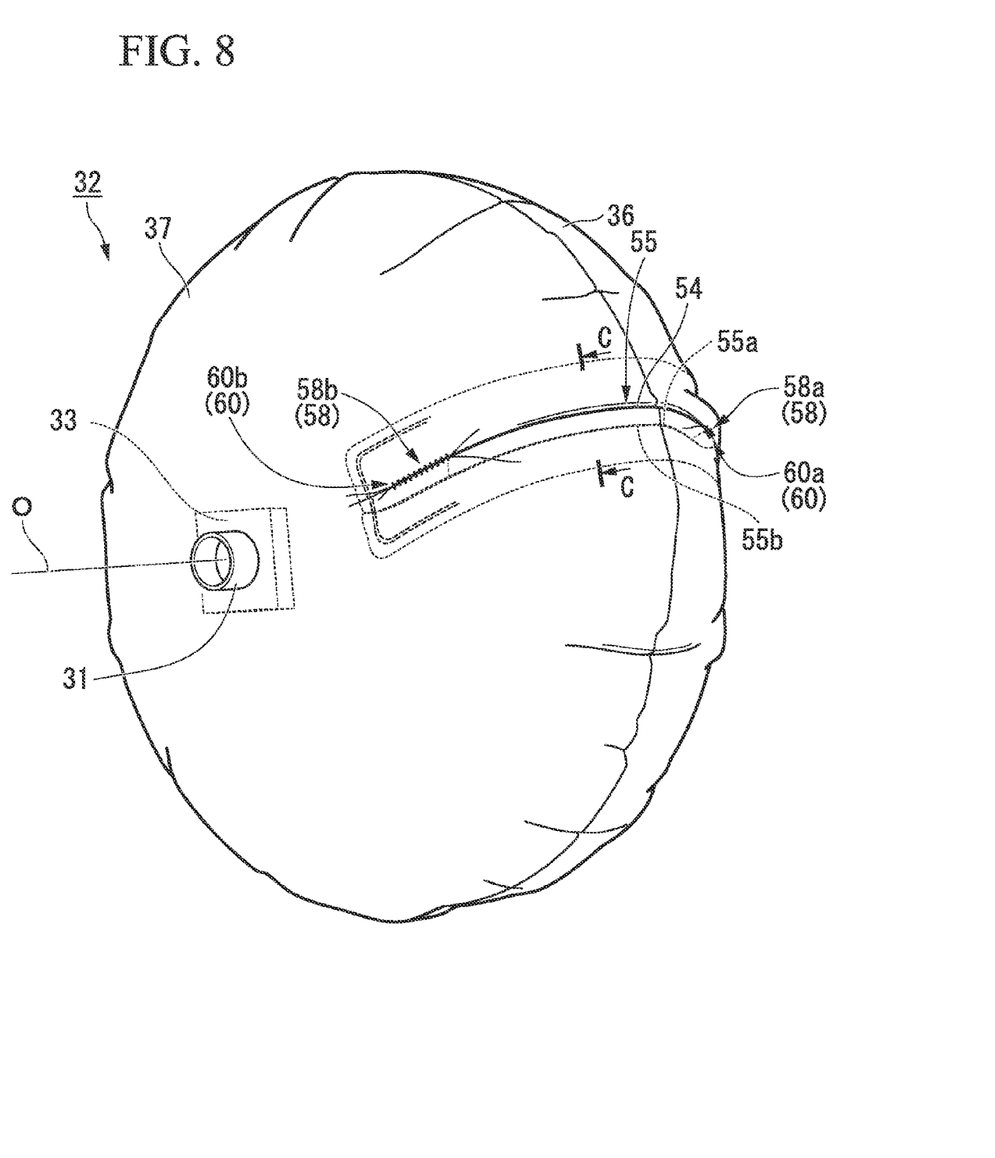
FIG. 8 is a perspective view of the airbag after expanding.

FIG. 8 is a perspective view of the airbag after expanding.

Figure 9:
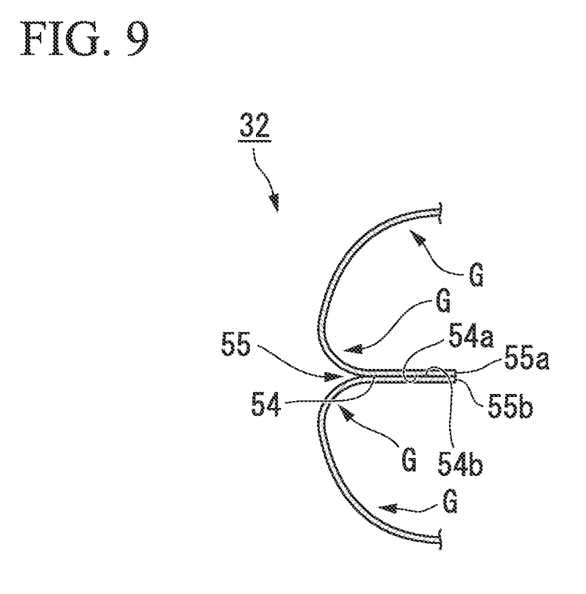
FIG. 9 is a cross-sectional view taken along a line C-C of FIG. 8.

FIG. 9 is a cross-sectional view taken along a line C-C of FIG. 8.

As shown in FIG. 8, if the airbag body 32 inflates and the expansion thereof is completed, the vent hole 55 is closed.

Specifically, as shown in FIG. 9, the slit side-end portions 55a and 55b are drawn into the inside of the airbag body 32, and therefore, side-end portion outer surfaces 54a and 54b of the slit 54 are in contact with each other in a state of facing each other. Thereby, the whole part of the slit 54 in the extending direction is closed.

At this time, gas G is sufficiently supplied to the inside of the airbag body 32, whereby the side-end portion outer surfaces 54a and 54b of the slit 54 are pressed against each other by the internal pressure of the airbag body 32 so as to be brought into close contact.

Thereby, when the airbag body 32 inflates and the expansion thereof is completed, the gas G is prevented from leaking through the slit 54.

Figure 10:
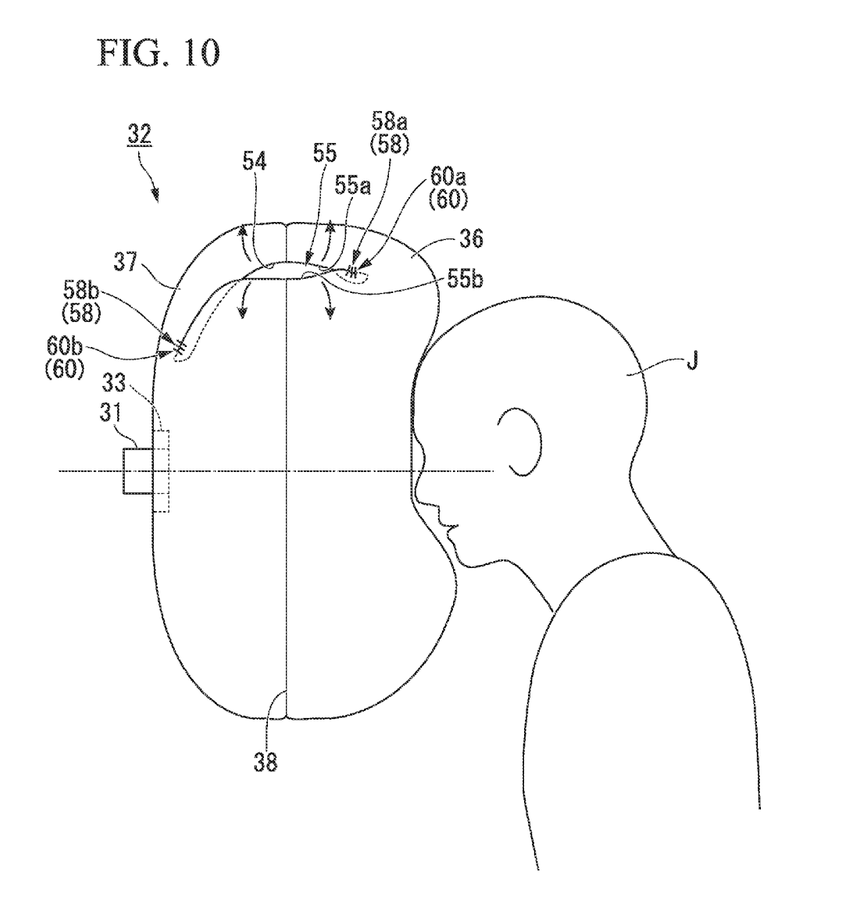
FIG. 10 is a side view of the airbag when an occupant is constrained.

FIG. 10 is a side view of the airbag body 32 when an occupant J is constrained.

When, after the airbag body 32 expands, an occupant J is moved toward the airbag body 32 by an inertial force at the time of vehicle collision, the occupant J is constrained by the airbag body 32.

Thereafter, along the normal line O, the airbag body 32 is pressed in a direction from a rear side to a front side (from the right side to the left side in FIG. 10) of the vehicle 1 by the occupant J.

At this time, the airbag body 32 is pressed by the occupant J, whereby the thickness thereof in a direction along the normal line O is decreased and flattened. Also, the outer diameter thereof is increased.

Then, the slit side-end portions 55a and 55b which are disposed so as to be drawn into the inside of the airbag body 32 are pulled out toward the outside of the airbag body 32.

Figure 11:
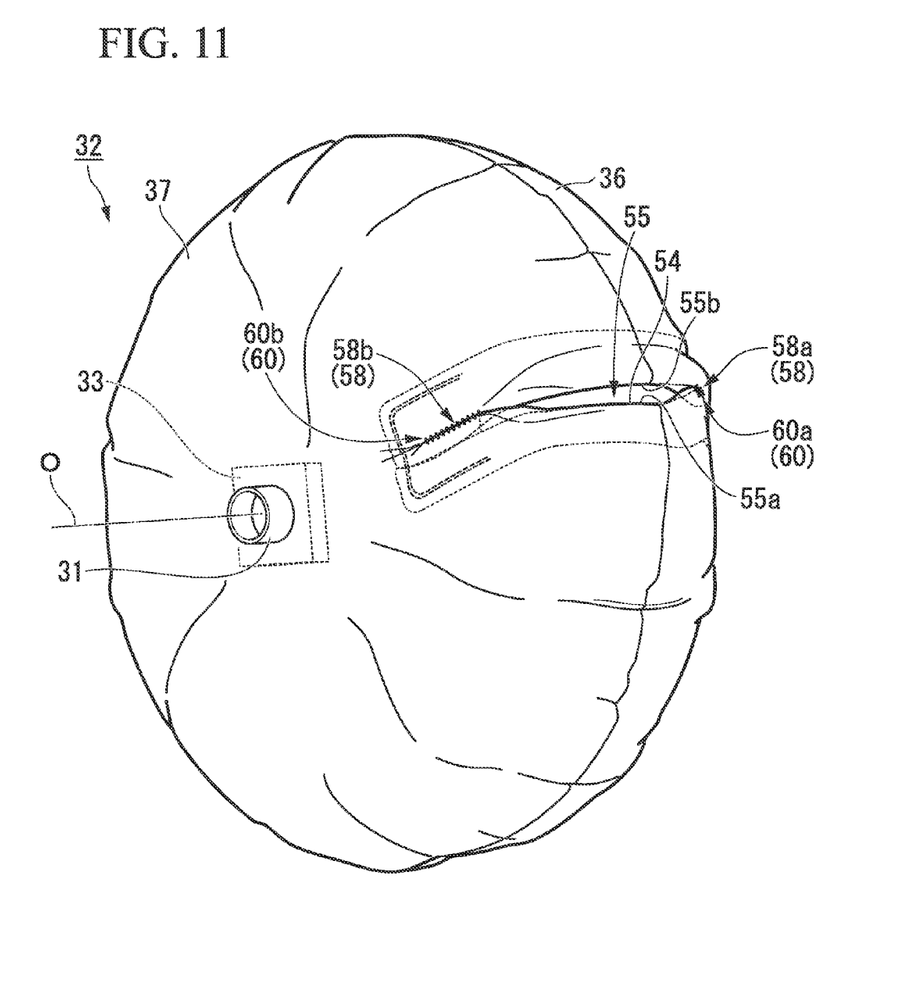
FIG. 11 is an explanatory view of a vent hole.

FIG. 11 is an explanatory view of the vent hole 55.

As shown in FIG. 11, when the slit side-end portions 55a and 55b are pulled out toward the outside of the airbag body 32, the slit 54 in a closed state becomes in an opened state, and therefore, the slit 54 functions as the vent hole 55.

As a result, the gas G in the airbag body 32 is released through the vent hole 55, whereby the excessive increase of the internal pressure of the airbag body 32 is suppressed when the occupant J is constrained by the airbag body 32.

In this case, if a length L1 of the slit 54 (hereinafter, referred as "slit-length L1", see FIG. 3) is set to be short, the time required to close the slit 54 is shortened.

Therefore, it is possible to reduce the time until the expansion of the airbag body 32 is completed.

On the other hand, if the slit-length L1 is set to be long, the opening area of the vent hole 55 is broadened when the slit 54 is opened.

Therefore, it is easy to release the gas G when the occupant is constrained by the airbag body 32.

Furthermore, if the drawing-in length L2 of the side-end portions 56a and 56b of the first side-end joining portion 60a and the side-end portions 57a and 57b of the second side-end joining portion 60b is enlarged, it causes the slit side-end portions 55a and 55b to be easily drawn into the inside of the airbag body 32. Subsequently, the time required to close the slit 54 is shortened.

Therefore, it is possible to reduce the time until the expansion of the airbag body 32 is completed.

On the other hand, if the drawing-in length L2 of the side-end portions 56a and 56b of the first side-end joining portion 60a and the side-end portions 57a and 57b of the second side-end joining portion 60b is shortened, it causes the slit side-end portions 55a and 55b to be easily pulled out toward the outside of the airbag body 32. Subsequently, the slit 54 is opened, whereby it is easy to form the vent hole 55.

Therefore, it is easy to release the gas G through the vent hole 55 when the occupant is constrained by the airbag body 32.

In this way, the slit-length L1 and the drawing-in length L2 are appropriately set in consideration of the balance between the time until the expansion of the airbag body 32 is completed and the release amount of the gas G of the airbag body 32 when the occupant J is constrained.

(Effect)

According to the embodiment, the vent hole 55 is configured of the slit 54 which is formed so as to be directed from the outer peripheral portion 32a of the airbag body 32 toward the central portions of the first base cloth 36 and the second base cloth 37, over the first base cloth 36 and the second base cloth 37.

In this case, when the gas G is introduced to the airbag body 32, the airbag body 32 inflates in a direction of the normal line O, and also, an outer diameter thereof is decreased. Subsequently, the slit 54 is closed.

Thereby, the leakage of the gas G when the airbag body 32 expands is suppressed, and therefore, the internal pressure of the airbag body 32 is instantly in a high-pressure state. Subsequently, it is possible for the airbag body 32 to rapidly expand.

Furthermore, when the occupant J is constrained by the airbag body 32 after the airbag body 32 expands, the airbag body 32 is pressed by the occupant J so as to be along the direction of the normal line O, and also, an outer diameter thereof is increased. Subsequently, the slit 54 is opened and functions as a vent hole 55.

Thereby, when the occupant J is constrained by the airbag body 32, the gas G is released from the airbag body 32. Subsequently, it is possible to suppress the excessive increase of the internal pressure of the airbag body 32.

Furthermore, since the vent hole 55 is the slit 54, it is possible to form the vent hole 55 by simply cutting the first base cloth 36 and the second base cloth 37. Therefore, the structure thereof is simple, and also, it is possible to manufacture it at a low cost.

As described above, the vent hole 55 is configured of the slit 54. Thereby, the airbag body 32 has a structure capable of being manufactured simply and at a low cost, and also, it is possible for the airbag body 32 to rapidly expand by instantly setting the internal pressure in a high-pressure state when expanding. In addition, it is possible to suppress the excessive increase of the internal pressure of the airbag body 32 when the occupant J is constrained by the airbag body 32.

Furthermore, according to the embodiment, the first side-end joining portion 60a is formed by disposing the side-end portions 56a and 56b of the first slit 56 so as to be drawn into the inside of the airbag body 32 and joining the side-end portions 56a and 56b to each other in the first base cloth 36.

Still further, the second side-end joining portion 60b is formed by disposing the side-end portions 57a and 57b of the second slit 57 so as to be drawn into the inside of the airbag body 32 and joining the side-end portions 57a and 57b to each other in the second base cloth 37.

Thereby, corresponding to the inflation of the airbag body 32 when the airbag body 32 expands, the whole parts of the slit side-end portions 55a and 55b along the extending direction of the slit 54 are drawn into the inside of the airbag body 32, and therefore, the slit 54 is easily closed.

Therefore, by instantly setting the internal pressure of the airbag body 32 in a high-pressure state when the airbag body 32 expands, it is possible for the airbag body 32 to further rapidly expand.

Furthermore, the invention is not limited to the embodiment described above.

The airbag apparatus 13 accommodated in the steering wheel 12 is exemplarily described in the embodiment.

However, the application of the invention is not limited to the airbag apparatus 13 accommodated in the steering wheel 12. For example, the invention can be applied to an airbag apparatus accommodated in a dashboard on a front passenger seat side or to a side curtain airbag apparatus accommodated in an edge portion of a vehicular window.

Single vent hole 55 is formed in the airbag body 32 of the embodiment. However, the number of the vent hole 55 is not limited to one, and may be more than one.

In addition, the number of the vent hole 55 is a design item to be appropriately set in consideration of the time until the expansion of the airbag body 32 is completed and the internal pressure when the occupant J is constrained by the airbag body 32.

The airbag body 32 of the embodiment is formed in a substantially circular shape, when seen in the normal direction. However, the figure of the airbag body 32 is not limited to the embodiment, and may have a polygonal shape such as a hexagon.

In the airbag body 32 of the embodiment, the joining between the first base cloth 36 and the second base cloth 37, between the side-end portion 56a and the side-end portion 56b in the first side-end joining portion 60a, and between the side-end portion 57a and the side-end portion 57b in the second side-end joining portion 60b are carried out in a sewn manner.

However, the method of joining therebetween is not limited to sewing, and the joining therebetween may be carried out by adhesive or weaving.

In the airbag body 32 of the embodiment, the first side-end joining portion 60a and the second side-end joining portion 60b are respectively provided in both end portions of the first slit end portion 58a on the first base cloth 36 side and the second slit end portion 58b on the second base cloth 37 side.

However, only the first side-end joining portion 60a may be provided in the first slit end portion 58a on the first base cloth 36 side, or only the second side-end joining portion 60 may be provided in the second slit end portion 58b on the second base cloth 37 side.

INDUSTRIAL APPLICABILITY

The airbag apparatus according to the invention can rapidly expand by instantly setting the internal pressure of the airbag body in a high-pressure state when expanding, and also, can suppress the excessive increase of the internal pressure of the airbag body when an occupant is constrained by the airbag body.

Furthermore, according to the invention, it is possible to supply an airbag apparatus capable of being manufactured simply and at a low cost.

DESCRIPTION OF THE REFERENCE SYMBOLS

1: vehicle
13: airbag apparatus (airbag apparatus for vehicle)
31: inflator
32: airbag body
36: first base cloth (base cloth)
37: second base cloth (base cloth)
36a, 37a: outer peripheral portion
54: slit
55: vent hole
58a: first slit end portion (slit end portion)
58b: second slit end portion (slit end portion)
56a, 56b, 57a, 57b: side-end portion
60a: first side-end joining portion (side-end joining portion)
60b: second side-end joining portion (side-end joining portion)

The invention claimed is:

1. An airbag apparatus for a vehicle comprising:
an airbag body formed by joining outer peripheral portions of a first base cloth and a second base cloth;
an inflator configured to introduce gas to an inside of the airbag body; and
a vent hole having a slit formed on the airbag body, the slit including a first slit and a second slit that are provided continuously with each other, the first slit having a portion extending from the outer peripheral portion of the first base cloth toward a central portion of the first base cloth, the second slit having a portion extending from the outer peripheral portion of the second base cloth toward a central portion of the second base cloth, wherein:
the slit intersects a line of a joining portion of the first and second base cloths; and
the outer peripheral portion of the first base cloth is sewn on the outer peripheral portion of the second base cloth.
2. The airbag apparatus according to claim 1, wherein
the vent hole comprises: end portions provided on the slit and respectively formed on the first and second base cloths; and a pair of side-end portions of the first and second base cloths that face each other interposing the slit therebetween, and
at least one of the end portions comprises a side-end joining portion formed by disposing the side-end portions so as to be drawn into the inside of the airbag body and joining the end portions to each other.
3. The airbag apparatus according to claim 1, wherein
a length of the second slit is longer than a length of the first slit.
4. The airbag apparatus according to claim 1, wherein
the first base cloth and the second base cloth are a fabric having a substantially circular shape in planar view.

\* \* \* \* \*